US 6,624,617 B2

(12) United States Patent
Holzer et al.

(10) Patent No.: US 6,624,617 B2
(45) Date of Patent: Sep. 23, 2003

(54) APPARATUS AND METHOD FOR STABILIZING THE VOLTAGE OF AN AC GENERATOR WITH VARIABLE ROTOR SPEED

(76) Inventors: Walter Holzer, Droste-Hülshoff-Weg 19, Meersburg (DE); Rudolf Manukov, Kekelidz Str. 17/47, Tbilissi (GE)

( * ) Notice: Subject to any disclaimer, the term of this patent is extended or adjusted under 35 U.S.C. 154(b) by 84 days.

(21) Appl. No.: 09/993,096

(22) Filed: Nov. 6, 2001

(65) Prior Publication Data

US 2002/0153867 A1 Oct. 24, 2002

(30) Foreign Application Priority Data

Apr. 20, 2001 (DE) .......................................... 101 19 668

(51) Int. Cl.⁷ ................................................. H02P 9/44
(52) U.S. Cl. ............................. 322/29; 322/28; 322/32; 290/40 E
(58) Field of Search ............................. 322/28, 29, 32; 310/179, 165; 290/31, 40 E; 318/818, 732

(56) References Cited

U.S. PATENT DOCUMENTS

| | | | | |
|---|---|---|---|---|
| 3,809,914 A | * | 5/1974 | Kilgore et al. | 290/38 R |
| 3,908,161 A | * | 9/1975 | Messenger | 322/29 |
| 4,035,712 A | * | 7/1977 | Yarrow et al. | 322/24 |
| 5,023,537 A | * | 6/1991 | Baits | 318/732 |
| 5,418,446 A | * | 5/1995 | Hallidy | 322/28 |
| 5,594,322 A | * | 1/1997 | Rozman et al. | 322/10 |
| 6,051,953 A | * | 4/2000 | Vithayathil | 318/818 |
| 6,188,204 B1 | * | 2/2001 | Vithayathil et al. | 322/29 |
| 6,462,429 B1 | * | 10/2002 | Dhyanchand et al. | 290/31 |

FOREIGN PATENT DOCUMENTS

GE    P 2000 2161 B    11/1998

* cited by examiner

*Primary Examiner*—Nicholas Ponomarenko
(74) *Attorney, Agent, or Firm*—Marshall, Gerstein & Borun

(57) ABSTRACT

The method for stabilizing the voltage of an AC generator with varying (alternating) rotor speed is characterized in that the voltage generated by an AC generator is maintained constant when the rotor speed changes. The control is carried out without the use of electrical contacts by means of a high-frequency pulse generator. The transformer of the high-frequency pulse generator is divided. The rotating part is provided on the rotor axis and the other part is stationary outside the rotor. Both parts are separated by an air gap. Deviations from a preset output voltage are controlling the pulse generator whose pulses are transmitted by the transformer to the power section of the rotor. The complete power section consisting of the coil and the electronic switch is arranged on the rotor so as to transmit only control currents without physical contact.

7 Claims, 1 Drawing Sheet

APPARATUS AND METHOD FOR STABILIZING THE VOLTAGE OF AN AC GENERATOR WITH VARIABLE ROTOR SPEED

BACKGROUND OF THE INVENTION

The present invention relates to a system for stabilizing the voltage of an AC generator with alternating or variable rotor speed such as generators used, for example, in motor vehicles, wind energy generators, turbo motors or emergency power generating sets.

It is known in the art to equip an AC generator inductor with a diode in the electric circuit of the self-magnetizing rotor. The disadvantage of such generators is that an unstable voltage is generated when the rotor speed changes.

Controlling the self-magnetization of the rotor via a non-contacting inductive energy transmission so as to obtain a certain, predetermined stable output voltage is also known in the art. This was previously achieved with the additional installation of a high-frequency pulse generator for stabilizing the voltage of an AC generator with variable rotor speed. The high-frequency pulse generator is used to control the rotor current via a transformer with two coils arranged on two separate magnetic cores.

Such a solution has been already described in Georgian patent GE P 2000 2161 B. The disadvantage of said invention is that high currents have to be transmitted across non-contacting conductors (i.e., across a void or air gap between magnetic cores equipped with coils or windings). The present invention eliminates said disadvantage.

BRIEF DESCRIPTION OF THE INVENTION

The problem is solved in accordance with the invention in that an electronic switch (11) is provided in the rotor (2) that implements incoming control pulses from the high-frequency pulse generator into interruptions in the self-magnetizing current. This results in the contactless transmission of low control currents only and considerably improves the control system, thereby increasing the reliability and efficiency of the AC generator overall.

BRIEF DESCRIPTION OF THE DRAWINGS

The electric block diagram of the circuit and components for stabilizing the voltage of an AC generator with alternating rotor speed is illustrated in FIG. 1.

A detailed specification of the new method will follow below.

DETAILED DESCRIPTION OF A PREFERRED EMBODIMENT

Figure 1:
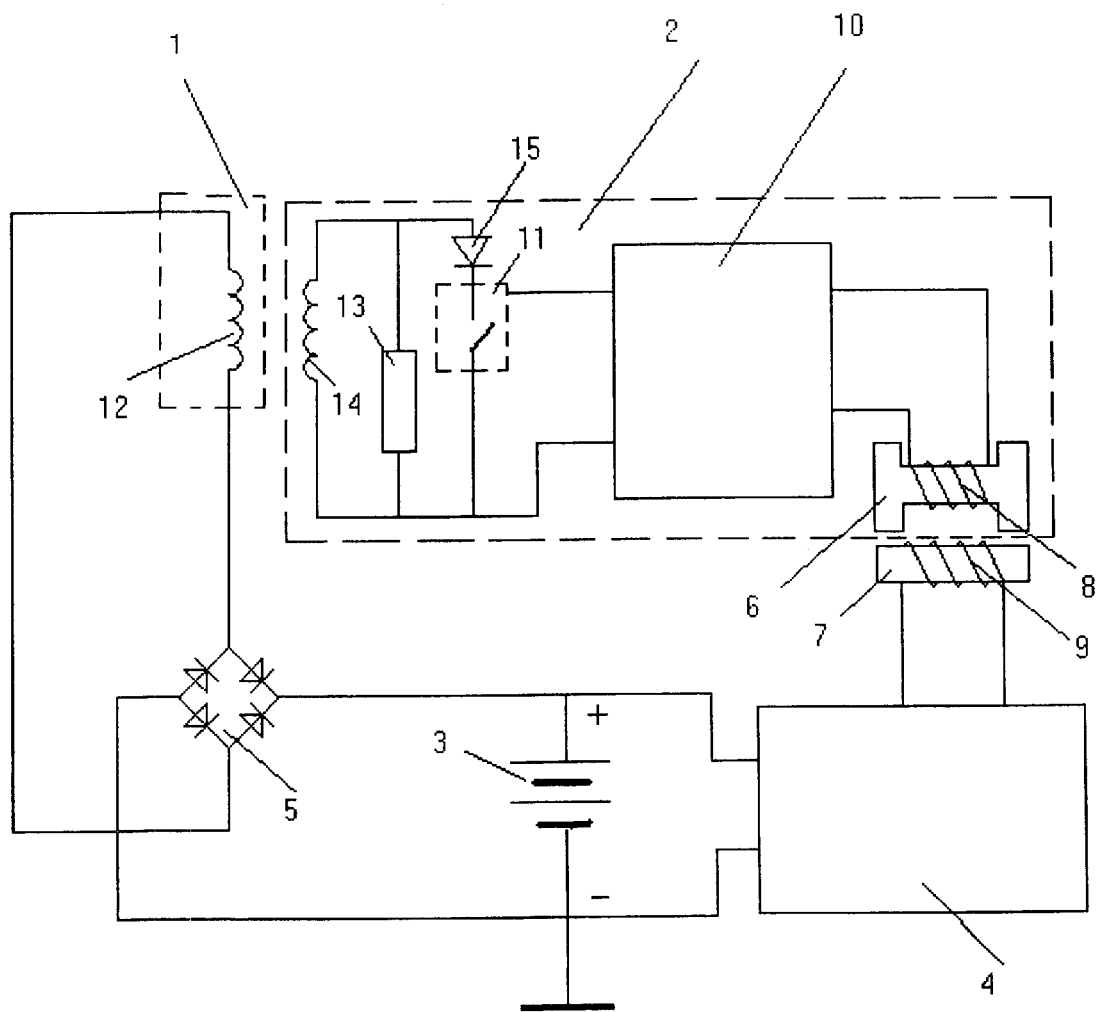

A comparator circuit in the high-frequency pulse generator (4) determines a tolerance range in which the frequency of the AC generator has to be stabilized.

The comparator circuit in the high-frequency pulse generator (4) will not cause the high-frequency pulse generator (4) and the electronic switch (11) to start operating before the voltage of the AC generator reaches the upper limit of the desired nominal voltage. Once activated, control pulses from the high-frequency pulse generator (4) are transmitted from the stationary magnetic core (7) to the magnetic core (6) rotating with the rotor (2) and respective control commands are transmitted to the electronic switch (11) via a co-rotating circuit (10) so as to reduce the rotor current. This reduces the self-magnetization of the rotor and generates a lower voltage.

When the generator voltage falls to the lower limit of the desired nominal voltage, the switch (11) receives a command via other control pulses of the high-frequency pulse generator (4) that reach the co-rotating circuit (10) through the non-connecting network causing the rotor current to increase so as to adequately feed an electrical or electronic device, for example to charge a battery (3) with the required voltage.

When the voltage generated by the AC generator is higher than the upper limit of the nominal voltage, the comparator causes the high-frequency pulse generator (4) to stop oscillating. No pulses are transmitted between the magnetic cores (6) and (7), thus opening the electronic switch (11) and interrupting the self-magnetization current of the rotor. This interaction of turning on and off can repeat itself indefinitely depending on the desired tolerance for the nominal voltage. It is supported by the hysteresis of the generator material and the type of device connected to the charger. For example, charging a battery substantially supports the stabilization of the voltage within narrow boundaries.

The resistor (13) shown in FIG. 1 protects the electronic switch (11) against excessive voltages at high speed in that a minimum current is always applied to the coil (14) even in the absence of a current flow via the electronic switch (11).

The diode (15) protects the electronic switch (11) against false polarization.

The result of the repeated turning on and off is that pulse packages are transmitted to the rotating circuit (10).

At a rapid change of speed, for example in the rapid acceleration of a vehicle, the length of such pulse packages can be affected in that the length of the pulse packages is also affected via an additional control system in the high-frequency pulse generator (4) by the frequency of the voltage of the AC generator (i.e. by its speed). In other words, this means that a rapidly increasing speed, and thus a significant increase in the alternating voltage, leads to a longer pulse package and thus to a higher reduction in the rotor current via the electronic switch (11). Of course, this requires that the electronic switch (11) not only turns on and off, but that it is programmable via the co-rotating electronic system (10) such that it gradually reduces the rotor current more or less, depending on the length of the pulse package.

As noted above, the present invention is especially suitable for charging batteries. Of course, the invention is also suitable for all other applications where an AC generator with alternating speed has to operate an electrical or electronic device at a constant voltage. Examples of such applications include: a lighting installation, an electrical water pump or similar applications.

The apparatus and the method of the invention can be used with a host of suitable circuits. The myriad of applications of an AC generator of this type have not been described in detail because most of them are classic variants of known electronic circuits.

REFERENCE LIST 1. stator
2. rotor
3. battery
4. high-frequency pulse generator
5. rectifier bridge
6. rotating magnetic core 7. stationary magnetic core
8. pulse generator coil
9. pulse generator coil
10. rotating electronic system
11. electronic switch
12. stator coil
13. resistor
14. rotor coil
15. diode

What is claimed is:

1. Apparatus for stabilizing the voltage of an AC generator, said generator having a rotor which turns at variable speeds, said apparatus comprising: a rotor with a coil on at least two distinctive poles and a stator with a coil, where the self-magnetizing current of the rotor is controlled via an electronic circuit which is dependent on the voltage generated by the AC generator, characterized in that the self-magnetizing current of the rotor is controlled by a co-rotating electronic system where the control pulses from a high-frequency pulse generator are transmitted, without the use of electrical contacts, to the co-rotating electronic system.

2. An AC generator in accordance with claim 1, wherein the co-rotating electronic system activates an electronic switch that also co-rotates and implements the incoming control pulses of a stationary high-frequency pulse generator into interruptions in the self-magnetizing current of the rotor.

3. An AC generator in accordance with claim 1, wherein the non-contact transmission of the high-frequency pulses to the rotating control system is inductive, comprising a transformer having a the rotating magnetic core with a coil and a stationary magnetic core with a coil, where an air gap is provided between the magnetic cores to allow a non-contacting rotation of the magnetic cores and relative to each other.

4. An AC generator in accordance with claim 1, wherein the high-frequency pulse generator comprises a comparator that turns the high-frequency pulse generator on and off in dependence of the voltage generated by the AC generator so as to transmit the control pulses without contact as pulse packages via a transformer with the separated magnetic cores.

5. An AC generator in accordance with claim 1, wherein the comparator determines when the high-frequency pulse generator is turned on and off and an additional control system is provided in the high-frequency pulse generator which alters the duration of the pulse packages in dependence of the frequency of the AC generator.

6. An AC generator in accordance with claim 1, wherein the control elements in the co-rotating electronic circuit alter the duration of the current flow in the electronic switch depending on the duration of the pulse packages.

7. The method of stabilizing the output voltage of an AC generator employing the apparatus of claim 1.

* * * * *

UNITED STATES PATENT AND TRADEMARK OFFICE
CERTIFICATE OF CORRECTION

PATENT NO.    : 6,624,617 B2
DATED         : September 23, 2003
INVENTOR(S)   : Walter Holzer et al.

It is certified that error appears in the above-identified patent and that said Letters Patent is hereby corrected as shown below:

Column 4,
Line 4, replace "having a the rotating magnetic core" with -- having a rotating magnetic core --.

Signed and Sealed this

Second Day of December, 2003

JAMES E. ROGAN
*Director of the United States Patent and Trademark Office*